Jan. 11, 1927.

T. H. BIRMINGHAM

AEROFOIL

Filed Oct. 12, 1923

INVENTOR
THOMAS H. BIRMINGHAM.
BY
ATTORNEY.

Patented Jan. 11, 1927.

1,613,602

UNITED STATES PATENT OFFICE.

THOMAS H. BIRMINGHAM, OF JAMAICA, NEW YORK, ASSIGNOR, BY MESNE ASSIGNMENTS, TO CURTISS AEROPLANE AND MOTOR COMPANY, INC., OF GARDEN CITY, NEW YORK, A CORPORATION OF NEW YORK.

AEROFOIL.

Application filed October 12, 1923. Serial No. 668,239.

My invention relates to airplanes and more particularly to improvements in aerofoil construction.

A characteristic of the invention is the construction of the aerofoil in a manner such that a substantial portion of its outer covering (preferably the under portion thereof) can be quickly and conveniently removed. An aerofoil thus characterized is especially desirable where metal is used in its construction. In metal aerofoil construction where the joints or connections between the several frame members are usually made, either by riveting, welding or brazing, obviously the provision of a removable cover portion giving access to the heretofore enclosed or inaccessible portions of the frame work is not only advantageous from a structural or assembly point of view, but in addition is extremely advantageous and desirable when repair or replacement work is required to be done.

A further characteristic of the invention is the construction of the removable cover portion in the form of a sliding cover panel, said panel, in the preferred embodiment of the invention, being substantially wedge-shaped, and so organized with respect to the aerofoil frame work as to be firmly engaged between slides extended longitudinally of the aerofoil structure.

Further characteristics of the invention will be hereinafter more particularly pointed out.

In the drawings, herein, like reference characters denote like or corresponding parts.

The invention, while especially adapted to aerofoils of metal construction, is not to be thus limited, nor is it intended that the invention shall be limited to airplane wings or supporting surfaces since it is obvious that a removable cover portion is often desirable in connection with other and varied types of aerofoils.

Figure 1:
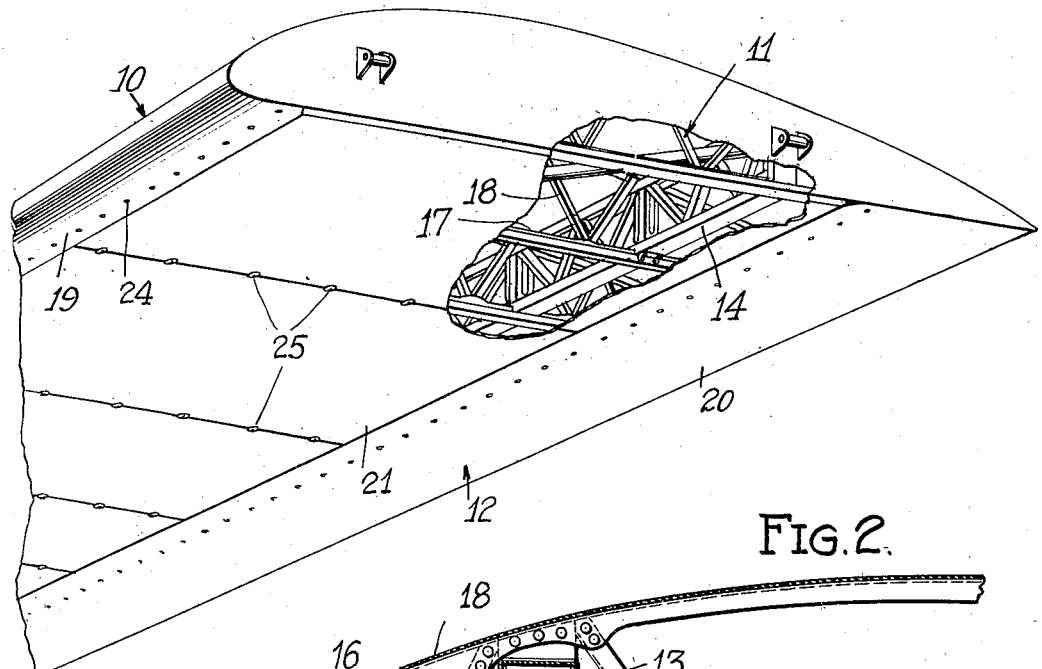
Fig. 1 is a perspective view of a portion of an airplane supporting surface having a portion of its outer covering broken away.

In Fig. 1 of the drawings, 10 designates as an entirety an airplane supporting surface or wing. Said wing may be either internally or externally braced. Preferably, however, it is of metal construction and comprises a supporting frame work 11 and an outer covering 12. Said supporting frame work in turn comprises a built up forward wing beam 13 and a correspondingly formed rear wing beam 14, said two wing beams being positioned respectively adjacent to the leading and to the trailing edge. The wing ribs, designated generally as 15, are also of metal construction, said ribs (see Fig. 2) being disposed at right angles to the wing beams, to which beams the ribs 15 are riveted or otherwise permanently fastened. Being of metal construction the ribs 15 preferably comprise a top chord 16, a bottom chord 17 and connecting portions 18, the latter (see Fig. 2) being terminally riveted in place.

Figure 2:
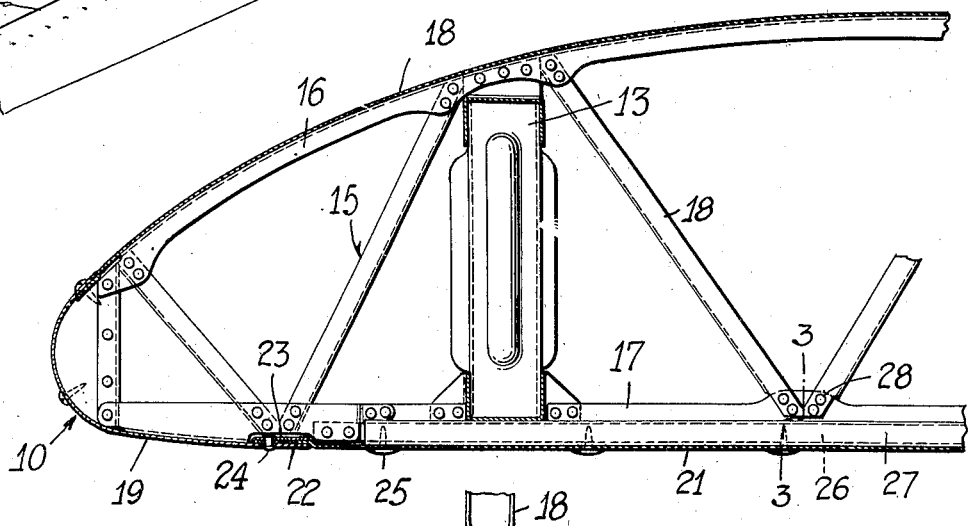
Fig. 2 is an enlarged transverse sectional view of the nose portion of said airplane supporting surface.
Figure 3:
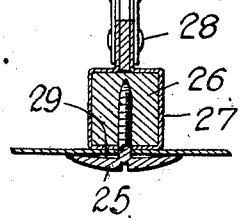
Fig. 3 is an enlarged section on the line 3—3 of Fig. 2.
Figure 4:
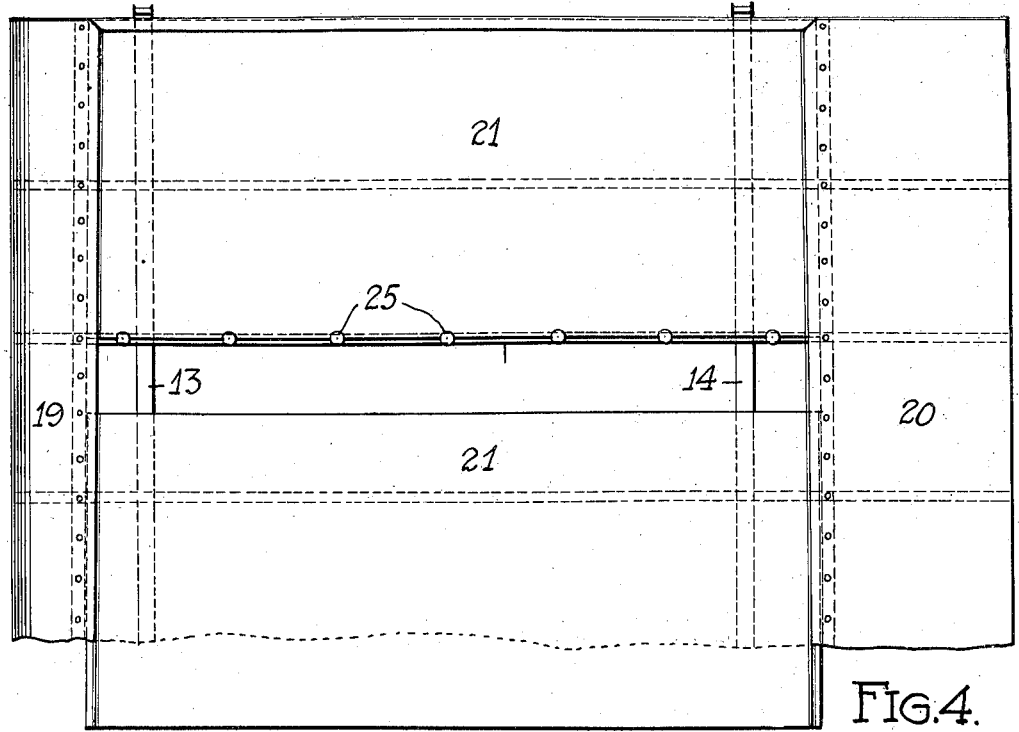
Fig. 4 is an inverted plan view of the supporting surface of Fig. 1 showing the manner in which one of the removable cover sections is adapted to be removed.

Instead of a fixed outer covering for the supporting frame work 11, the outer covering 12 of the wing herein shown is made in part at least removable. Said outer covering 12 preferably comprises a fixed portion 18 which extends from a point adjacent to the leading edge to a point adjacent to the trailing edge on the top side of the wing, a fixed portion 19 which extends from a point adjacent to the leading edge on the top side of the wing to a corresponding point on the underside of the wing, and a fixed portion 20 which extends from a point adjacent to the trailing edge of the wing to a point in the vicinity of the rear wing beam 14 on the under side of the wing. Said wing cover portions 18, 19 and 20 are adapted to be riveted, soldered, welded or otherwise permanently fastened in place. The removable wing cover portion, herein designated as 21, is preferably that portion of the under covering of the wing which extends from a point in the vicinity of the leading edge to a point in the vicinity of the trailing edge of the wing. Along its opposite longitudinal edges the removable cover portion 21 of the wing is inbent as at 22 to engage beneath the spaced edges of the fixed cover portions 19 and 20, said spaced edges, in conjunction with metal strips 23, affording slides or guideways within which the opposite longitudinal edges of the removable cover portion 21 are held. As indicated in Fig. 2, the strips 23 are riveted as at 24 respectively to the fixed portions 19 and 20 of the wing covering 12. If desired, the removable wing cover portion 21 may comprise a plurality of cover sections (see Fig. 1) each of which sections is adapted to be separately removed by sliding the respective sections outwardly toward the wing tip or away from the butt end of the wing.

To insure a snug fit, and to render a better fastening for the removable cover sections, the guides therefor converge slightly inwardly from the wing tip toward the butt end of the wing and the respective sections, when finally in place, abut edge to edge in a fore and aft direction along lines coincident with certain of the wing ribs 15.

As a further means for fastening the removable cover sections in place, wood screws 25 are provided. These screws are adapted to engage in wood strips 26 metal bound as indicated at 27 and fastened as indicated at 28 to the bottom chord 17 of certain of the wing ribs. Accordingly, it is necessary when releasing the removable cover sections to first remove the wood screws which, when in place, firmly grip the abutting edges of the cover sections by reason of the head formation of the screws, which screw heads have their under faces slightly concaved as at 29.

Figure 5:
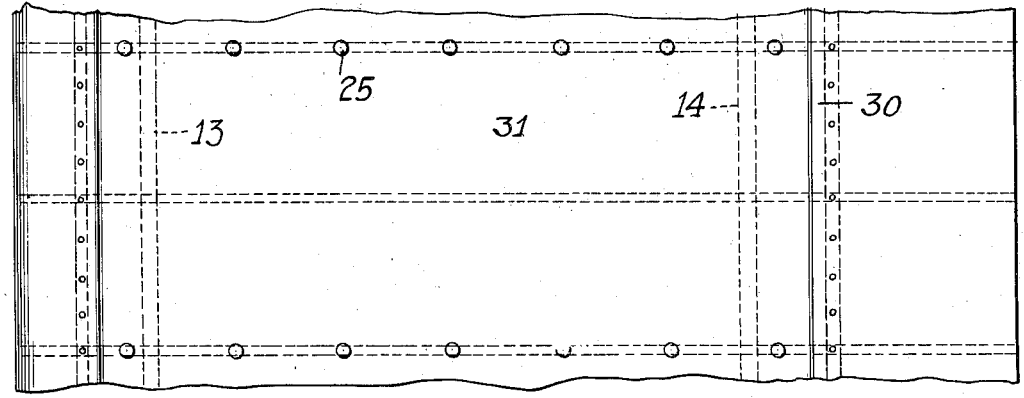
Fig. 5 is a view similar to Fig. 4 illustrating a modified type of removable cover portion.

In the modification illustrated in Fig. 5, the guides 30 for the removable cover section 31 extend parallel and the said removable cover is adapted to be snapped in place by deflection, i. e. drawing the edges of the cover section together, allowing said edges to engage beneath the guide plates, and thereupon releasing the cover section to admit of lateral expansion into firm engaging contact beneath the guides.

From the above, taken in connection with the accompanying drawings, it is obvious that through the provision of a removable cover portion access may be gained to the interior frame work of the wing or aerofoil through the opening formed in the under side thereof, which opening, in width, is preferably at least equal to the spacing between the wing beams 13 and 14 of the wing. The interior of the wing being thus accessible, it is further obvious that all riveting required to be done, or brazing or welding necessary to assembly, and all inside work to be performed, can be conveniently done without in any way mutilating or destroying any given portion of the wing. By making the under covering of the wing, as distinguished from the top covering, removable, that portion of the covering subject to the least flight load is the covering required to be disturbed. Moreover, by the use of reinforcing wood strips, common wood screws may be used to advantage as the means for fastening the removable cover section or sections in place.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. An aerofoil including a skeleton frame work, an outer covering for said frame work, that portion of said outer covering affording a top covering for said frame work being fixed in its relation thereto, whereas the major part of that portion of said outer covering affording a bottom covering for said frame work is bodily removable, and retaining strips carried by said frame work on the under side thereof and beneath which the edges of the removable cover portion are adapted to engage.

2. An aerofoil including a skeleton frame work and an outer covering therefor, said outer covering being in part fixed and in part removable in its relation to said frame work, and converging retaining strips carried by said frame work beneath which the edges of the removable cover portion are adapted to engage.

3. An aerofoil including a skeleton frame and an outer covering therefor, a portion of said outer covering being removable in its relation to said frame work, and spaced retaining strips extending longitudinally of said frame work and providing opposed grooves within which the fore and aft edges of said removable cover portion are adapted to engage.

4. An aerofoil including a frame work and an outer covering therefor, a portion of said outer covering being removable in its relation to said frame work, and separate retaining strips extending longitudinally of said frame work on the under side thereof and providing opposed grooves having their open sides facing toward each other and within which the opposite fore and aft edges of said removable cover portion are adapted to slidably engage.

5. An aerofoil including a frame work and an outer covering therefor, said outer covering being in part fixed and in part removable in its relation to said frame work, said removable cover portion in turn comprising a plurality of laterally abutting panel sections, and spaced retaining strips extending longitudinally of said frame work and beneath which the fore and aft edges of the several panel sections of the removable cover portion are adapted to engage.

6. An aerofoil including a frame work and an outer covering therefor, a portion of said outer covering being removable in its relation to said frame work, said removable portion comprising a plurality of laterally abutting panel sections, spaced retaining strips carried by said frame work and beneath which the fore and aft edges of the several panel sections of the removable cover portion are adapted to engage and means engaging said panel sections, adjacent to the lateral margins thereof to provide a further retaining means.

7. In an aerofoil, the combination with a frame work including spaced longitudinal beams and fore and aft ribs, of an outer covering for said frame work including a removable cover portion, said removable cover portion in turn comprising a plurality of laterally abutting panel sections, means extending longitudinally of the frame work beneath which the fore and aft edges of the several panel sections are adapted to engage, and means engaging said panel sections adjacent the lateral margins thereof to provide a further retaining means, said last mentioned retaining means being coincident with certain of said ribs.

In testimony whereof I hereunto affix my signature.

THOMAS H. BIRMINGHAM.